(12) United States Patent
Opris et al.

(10) Patent No.: US 10,110,121 B2
(45) Date of Patent: Oct. 23, 2018

(54) CHARGE PUMP WITH A RAPID-DISCHARGE PATH

(71) Applicant: Fortemedia, Inc., Santa Clara, CA (US)

(72) Inventors: Ion Opris, San Jose, CA (US); Abu Hena M Kamal, Santa Clara, CA (US); Lee Tay Chew, Cupertino, CA (US); Shomo Chen, San Jose, CA (US)

(73) Assignee: FORTEMEDIA, INC., Santa Clara, CA (US)

( * ) Notice: Subject to any disclaimer, the term of this patent is extended or adjusted under 35 U.S.C. 154(b) by 0 days.

(21) Appl. No.: 15/725,594

(22) Filed: Oct. 5, 2017

(65) Prior Publication Data

US 2018/0109180 A1 Apr. 19, 2018

Related U.S. Application Data

(60) Provisional application No. 62/409,919, filed on Oct. 19, 2016.

(51) Int. Cl.
*H02M 3/07* (2006.01)
*H02M 1/32* (2007.01)

(52) U.S. Cl.
CPC ............. *H02M 3/07* (2013.01); *H02M 3/073* (2013.01); *H02M 2001/322* (2013.01); *H02M 2003/075* (2013.01)

(58) Field of Classification Search
CPC ...................................................... H02M 3/07
USPC ........................................................ 327/536
See application file for complete search history.

(56) References Cited

U.S. PATENT DOCUMENTS

| | | | | |
|---|---|---|---|---|
| 5,841,703 | A * | 11/1998 | Wojciechowski | G11C 5/145 365/189.09 |
| 6,483,282 | B1 | 11/2002 | Bayer | |
| 2004/0263239 | A1* | 12/2004 | Wang | H02M 3/073 327/536 |

OTHER PUBLICATIONS

Richard, J.F., et al.; "High Voltage Charge Pump Using Standard CMOS Technology;" Abstract; IEEE Conference Publication; 2004; pp. 1-2.
Richard, J.F., et al.; "High Voltage Charge Pump Using Standard CMOS Technology;" Regular Session G: High Voltage Techniques and Continuous Time Filtering; IEEE; 2204; pp. 317-320.

* cited by examiner

*Primary Examiner* — William Hernandez
(74) *Attorney, Agent, or Firm* — McClure, Qualey & Rodack, LLP

(57) ABSTRACT

A charge pump includes a first unidirectional conducting device, a flying capacitor, a second unidirectional conducting device, an output capacitor, a first switch, and a second switch. The first unidirectional conducting device unidirectionally couples a supply voltage to an internal node. The flying capacitor is coupled between the internal node and a clock signal. The second unidirectional conducting device unidirectionally couples the internal node to an output node. The output capacitor is coupled between the output node and a ground. The first switch couples a discharge node to the ground according to a discharge signal. The second switch couples the output node to the discharge node according to the voltage of the internal node.

24 Claims, 5 Drawing Sheets

300

CHARGE PUMP WITH A RAPID-DISCHARGE PATH

CROSS REFERENCE TO RELATED APPLICATIONS

This application claims the benefit of U.S. Provisional Application No. 62/409,919, filed on Oct. 19, 2016, the entirety of which is incorporated by reference herein.

BACKGROUND OF THE INVENTION

Field of the Invention

The disclosure relates generally to a capacitive charge pump, and more specifically it relates to a charge pump with a discharge path for rapidly discharging the output voltage of the charge pump.

Description of the Related Art

The demand for portable applications such as cellular phones is ever-increasing. Charge pump-type DC/DC converters are often accommodated in ICs of portable electronic devices such as mobile phones powered by rechargeable battery power supplies. These charge pumps need to be as small as possible so that they take up only a small area of the IC. Capacitive charge pumps are not only low-cost and simple compared to inductor-based converters, but also highly compact for small current consumption.

In application of MEMS-based high-definition (HD) Digital Microphone (DMIC), the embedded charge pump can be discharged and then charged to a lower voltage to achieve a high dynamic range. Therefore, a charge pump with a discharge path is urgently required.

BRIEF SUMMARY OF THE INVENTION

In an embodiment, a charge pump comprises: a first unidirectional conducting device, a flying capacitor, a second unidirectional conducting device, an output capacitor, a first switch, and a second switch. The first unidirectional conducting device unidirectionally couples a supply voltage to an internal node. The flying capacitor is coupled between the internal node and a clock signal. The second unidirectional conducting device unidirectionally couples the internal node to an output node. The output capacitor is coupled between the output node and a ground. The first switch couples a discharge node to the ground according to a discharge signal. The second switch couples the output node to the discharge node according to a voltage of the internal node.

According to an embodiment of the invention, the clock signal comprises a high voltage level and a low voltage level, wherein the high voltage level is equal to the supply voltage and the low voltage level is equal to the ground.

According to an embodiment of the invention, when the clock signal is at the low voltage level, the flying capacitor is charged by the supply voltage through the first unidirectional conducting device. When the clock signal is at the high voltage level, a voltage of the internal node is boosted to twice the supply voltage and charges the output capacitor through the second unidirectional conducting device.

According to an embodiment of the invention, when the discharge signal is equal to the supply voltage, an output voltage of the output node is discharged to the ground through the first switch and the second switch.

According to an embodiment of the invention, when the discharge signal is equal to the supply voltage, the first switch is turned ON to discharge the discharge node to the ground. When the voltage of the internal node is boosted to twice the supply voltage, the second switch is turned ON to discharge the output voltage to the discharge node.

According to an embodiment of the invention, the first switch comprises a first N-type transistor comprising a gate terminal, a source terminal, a drain terminal, and a bulk terminal. The gate terminal is controlled by the discharge signal, the source terminal is coupled to the ground, the drain terminal is coupled to the discharge node, and the bulk terminal is coupled to the ground.

According to an embodiment of the invention, the second switch comprises a second N-type transistor comprising a gate terminal, a source terminal, a drain terminal, and a bulk terminal. The gate terminal is controlled by a voltage of the internal node, the source terminal is coupled to the discharge node, the drain terminal is coupled to the output node, and the bulk terminal is coupled to the ground.

According to an embodiment of the invention, a junction breakdown voltage and a gate oxide breakdown voltage of the first N-type transistor and the second N-type transistor are less than the output voltage.

According to an embodiment of the invention, the first unidirectional conducting device comprises a first P-type transistor comprising a gate terminal, a source terminal, a drain terminal, and a bulk terminal. The gate terminal is coupled to the internal mode, the source terminal is coupled to the internal mode, the drain terminal is supplied by the supply voltage, and the bulk terminal is coupled to the internal node.

According to an embodiment of the invention, the second unidirectional conducting device comprises a second P-type transistor comprising a gate terminal, a source terminal, a drain terminal, and a bulk terminal. The gate terminal is coupled to the output node, the source terminal is coupled to the output node, the drain terminal is coupled to the internal node, and the bulk terminal is coupled to the output node.

According to an embodiment of the invention, a junction breakdown voltage and a gate oxide breakdown voltage of the first P-type transistor and the second P-type transistor are less than the output voltage.

In another embodiment, a charge pump comprises: a first unidirectional conducting device, a first flying capacitor, a second unidirectional conducting device, a second flying capacitor, a third unidirectional conducting device, an output capacitor, a first switch, a second switch, and a third switch. The first unidirectional conducting device unidirectionally couples a supply voltage to a first internal node. The first flying capacitor is coupled between the first internal node and a first clock signal. The second unidirectional conducting device unidirectionally couples the first internal node to a second internal node. The second flying capacitor is coupled between the second internal node and a second clock signal. The third unidirectional conducting device unidirectionally couples the second internal node to an output node. The output capacitor is coupled between the output node and a ground. The first switch couples a first discharge node to the ground according to a discharge signal. The second switch couples a second discharge node to the first discharge node according to a voltage of the first internal node. The third switch couples the output node to the second discharge node according to a voltage of the second internal node.

According to an embodiment of the invention, the first clock signal and the second clock signal comprise a high voltage level and a low voltage level. The high voltage level is equal to the supply voltage and the low voltage level is equal to the ground.

According to an embodiment of the invention, when the first clock signal is at the low voltage level, the first flying capacitor is charged by the supply voltage through the first unidirectional conducting device. When the first clock signal is at the high voltage level and the second clock signal is at the low voltage level, a voltage of the first internal node is boosted to twice the supply voltage and charges the second flying capacitor. When the second clock signal is at the high voltage level, a voltage of the second internal node is boosted to triple the supply voltage and charges the output capacitor through the third unidirectional conducting device.

According to an embodiment of the invention, when the discharge signal is equal to the supply voltage, an output voltage of the output node is discharged to the ground through the first switch, the second switch, and the third switch.

According to an embodiment of the invention, when the discharge signal is equal to the supply voltage, the first switch is turned ON to discharge the discharge node to the ground. When the voltage of the first internal node is boosted to twice the supply voltage, the second switch is turned ON to discharge the voltage of the second discharge node to the first discharge node. When the voltage of the second internal node is boosted to triple the supply voltage, the third switch is turned ON to discharge the output voltage to the second discharge node.

According to an embodiment of the invention, the first switch comprises a first N-type transistor comprising a gate terminal, a source terminal, a drain terminal, and a bulk terminal. The gate terminal is controlled by the discharge signal, the source terminal is coupled to the ground, the drain terminal is coupled to the first discharge node, and the bulk terminal is coupled to the ground.

According to an embodiment of the invention, the second switch comprises a second N-type transistor comprising a gate terminal, a source terminal, a drain terminal, and a bulk terminal. The gate terminal is controlled by a voltage of the first internal node, the source terminal is coupled to the first discharge node, the drain terminal is coupled to the second discharge node, and the bulk terminal is coupled to the ground.

According to an embodiment of the invention, the third switch comprises a third N-type transistor comprising a gate terminal, a source terminal, a drain terminal, and a bulk terminal. The gate terminal is controlled by a voltage of the second internal node, the source terminal is coupled to the second discharge node, the drain terminal is coupled to the output node, and the bulk terminal is coupled to the ground.

According to an embodiment of the invention, a junction breakdown voltage and a gate oxide breakdown voltage of the first N-type transistor, the second N-type transistor, and the third N-type transistor are less than twice the supply voltage.

According to an embodiment of the invention, the first unidirectional conducting device comprises a first P-type transistor comprising a gate terminal, a source terminal, a drain terminal, and a bulk terminal. The gate terminal is coupled to the first internal mode, the source terminal is coupled to the first internal mode, the drain terminal is supplied by the supply voltage, and the bulk terminal is coupled to the first internal node.

According to an embodiment of the invention, the second unidirectional conducting device comprises a second P-type transistor comprising a gate terminal, a source terminal, a drain terminal, and a bulk terminal. The gate terminal is coupled to the second internal mode, the source terminal is coupled to the second internal mode, the drain terminal is coupled to the first internal node, and the bulk terminal is coupled to the second internal node.

According to an embodiment of the invention, the third unidirectional conducting device comprises a third P-type transistor comprising a gate terminal, a source terminal, a drain terminal, and a bulk terminal. The gate terminal is coupled to the output node, the source terminal is coupled to the output node, the drain terminal is coupled to the second internal node, and the bulk terminal is coupled to the output node.

According to an embodiment of the invention, a junction breakdown voltage and a gate oxide breakdown voltage of the first P-type transistor, the second P-type transistor, and the third P-type transistor are less than twice the supply voltage.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
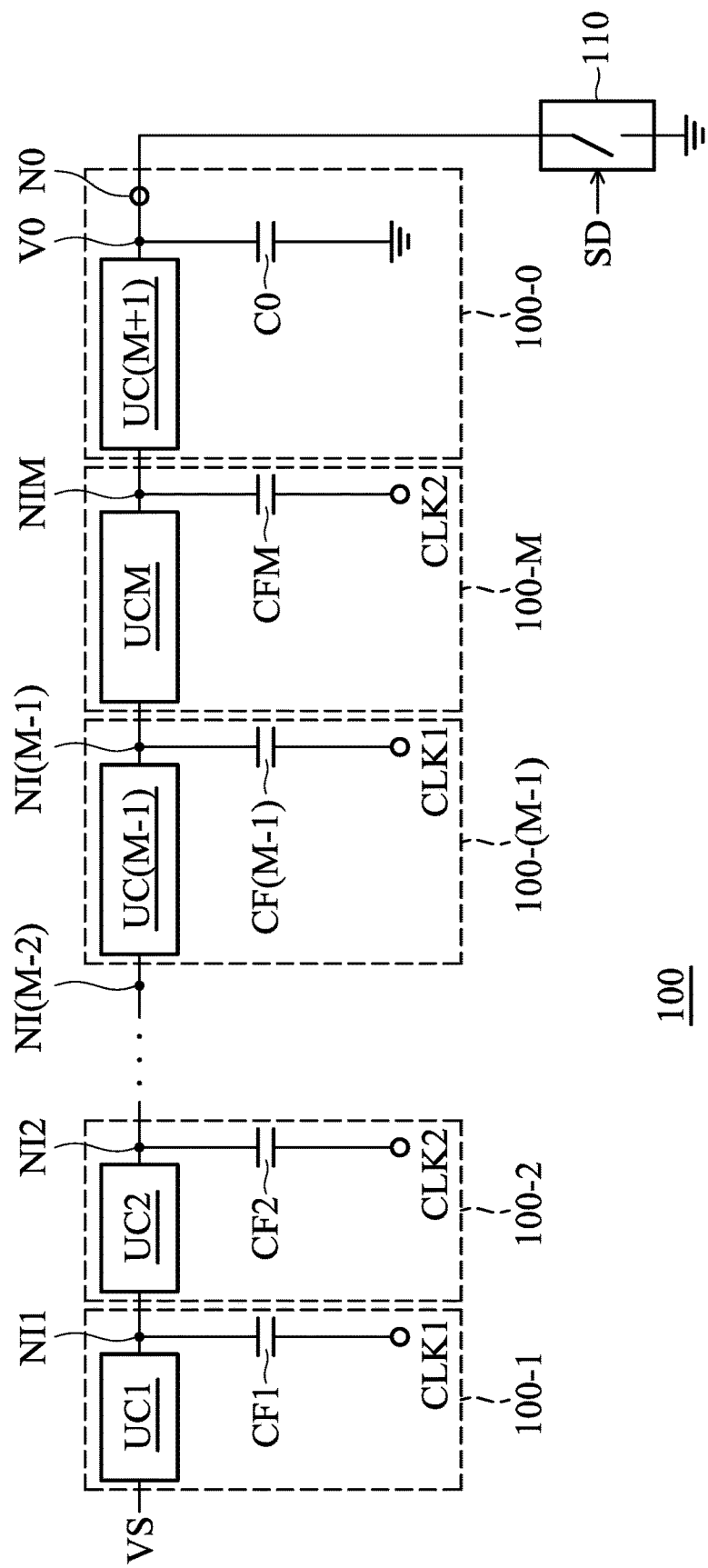
FIG. 1 is a block diagram of a charge pump in accordance with an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a block diagram of a charge pump in accordance with an embodiment of the invention. As shown in FIG. 1, the charge pump 100 includes a first stage 100-1, a second stage 100-2, ... a (M−1)-th stage 100-(M−1), a M-th stage 100-M, and an output stage 100-O.

The first stage 100-1 includes a first unidirectional conducting device UC1 unidirectionally coupling the supply voltage VS to a first internal node NI1 and a first flying capacitor CF1 coupled between the first internal node NI1 and a first clock signal CLK1.

The second stage 100-2 includes a second unidirectional conducting device UC2 unidirectionally coupling the first internal node NI1 to the second internal node NI2 and a second flying capacitor CF2 coupled between the second internal node NI2 and a second clock signal CLK2.

The (M−1)-th stage 100-(M−1) includes a (M−1)-th unidirectional conducting device UC(M−1) unidirectionally coupling a (M−2)-th internal node NI(M−2) to a (M−1)-th internal node NI(M−1) and a (M−1)-th flying capacitor CF(M−1) coupled between the (M−1)-th internal node NI(M−1) and the first clock signal CLK1.

The M-th stage 100-M includes a M-th unidirectional conducting device UCM unidirectionally coupling the (M−1)-th internal node NI(M−1) to a M-th internal node NIM and a M-th flying capacitor CFM coupled between the M-th internal node NIM and the second clock signal CLK2.

The output stage 100-O includes a (M+1)-th unidirectional conducting device UC(M+1) unidirectionally coupling the M-th internal node NIM to an output node NO and an output capacitor CO coupled between the output node NO and a ground.

According to an embodiment of the invention, the first clock signal CLK1 and the second clock signal CLK2 include a high voltage level and a low voltage level, in which the high voltage level is equal to the supply voltage VS and the low voltage level is equal to the ground.

According to other embodiment of the invention, the high voltage level and the low voltage level could be any other voltage designed by the circuit designer. It is merely illustrated herein for the simplicity of explanation but not intended to be limited thereto.

According to an embodiment of the invention, when the first clock signal CLK1 is at the low voltage level, the supply voltage VS charges the first flying capacitor CF1 through the first unidirectional conducting device UC1. When the first clock signal CLK1 is at the high voltage level and the second clock signal CLK2 is at the low voltage level, the voltage of the first internal node ND is boosted to as high as twice the supply voltage VS, which charges the second flying capacitor CF2 through the second unidirectional conducting device UC2. When the second clock signal CLK2 is at the high voltage level, the voltage of the second internal node NI2 is boosted to as high as triple the supply voltage VS and charges the fly capacitor of the next stage.

Therefore, the output voltage VO is boosted to as high as (M+1) times of the supply voltage VS through the first flying capacitor CF1, the second flying capacitor CF2, . . . , the (M−1)-th flying capacitor CF(M−1), and the M-th flying capacitor CFM.

According to an embodiment of the invention, the unidirectional conducting devices UC1, UC2, . . . , UCM, and UC(M+1) are devices operated with voltage less than the supply voltage VS. That is, the breakdown voltage of the unidirectional conducting devices UC1, UC2, . . . , UCM, and UC(M+1) is less than twice the supply voltage VS.

In addition, the charge pump 100 further includes a switch 110 which is configured to rapidly pull the output voltage VO to the ground according to the discharge signal SD. According to an embodiment of the invention, the output voltage VO could be boosted to as high as (M+1) times of the supply voltage VS such that the switch 110 has to be a high-voltage device to sustain (M+1) times of the supply voltage VS.

Since the switch 110 should be a high voltage device to sustain the output voltage VO, the size of the switch 110 would be really huge and the charge pump 100 should be implemented in a complicated high-voltage process, which leads to higher cost.

Figure 2:
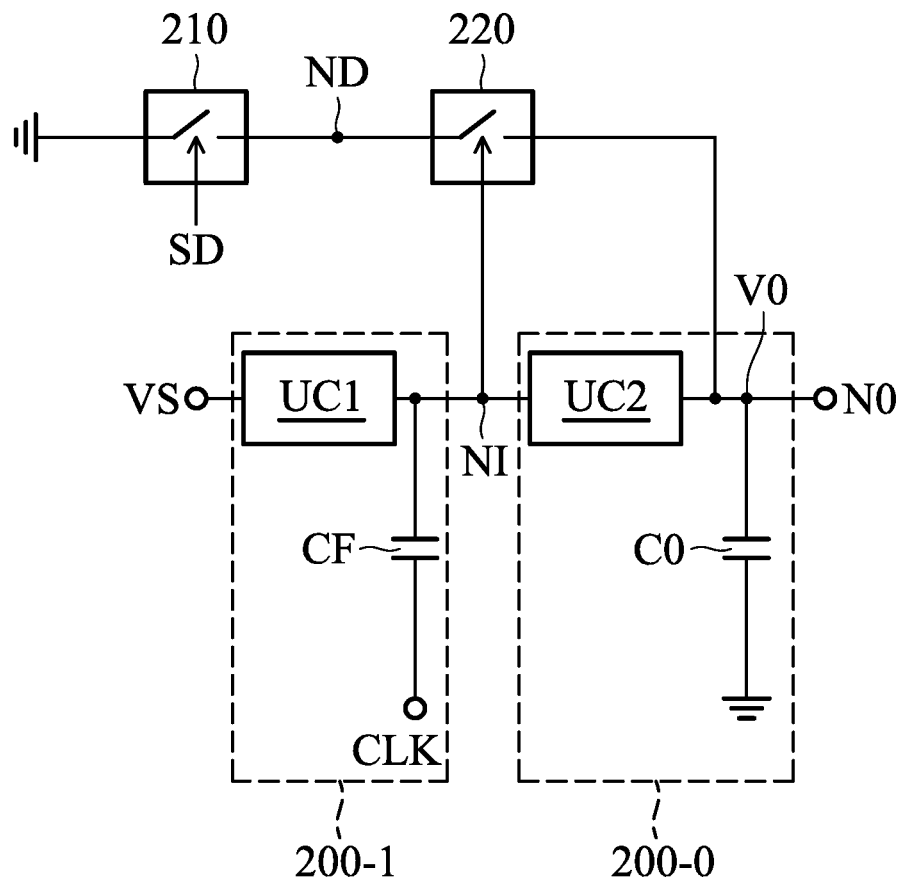
FIG. 2 is a block diagram of a charge pump in accordance with another embodiment of the invention.

FIG. 2 is a block diagram of a charge pump in accordance with another embodiment of the invention. As shown in FIG. 2, the charge pump 200 includes a first stage 200-1, an output stage 200-O, a first switch 210, and a second switch 220. The first stage 200-1 includes a first unidirectional conducting device UC1 unidirectionally coupling the supply voltage VS to an internal node NI and a flying capacitor CF coupled between the internal node NI and a clock signal CLK.

The output stage 100-O includes a second unidirectional conducting device UC2 unidirectionally coupling the internal node NI to an output node NO and an output capacitor CO coupled between the output node NO and a ground.

The first switch 210 is configured to couple a discharge node ND to the ground according to the discharge signal SD. The second switch 220 is configured to couple the output node NO to the discharge node ND according to the voltage of the internal node NI.

According to an embodiment of the invention, the clock signal CLK includes a high voltage level equal to the supply voltage VS and a low voltage level equal to the ground. According to other embodiment of the invention, the high voltage level and the low voltage level could be any other voltage designed by the circuit designer. It is merely illustrated herein for the simplicity of explanation but not intended to be limited thereto.

According to an embodiment of the invention, when the clock signal CLK is at the low voltage level, the flying capacitor CF is charged by the supply voltage VS through the first unidirectional conducting device UC1. When the clock signal CLK is at the high voltage level, the voltage of the internal node NI is boosted to as high as twice the supply voltage VS, which charges the output capacitor CO through the second unidirectional conducting device UC2. Therefore, the output voltage VO could be as high as twice the supply voltage VS.

According to an embodiment of the invention, when the first switch 210 is turned ON by the discharge signal SD, the discharge node ND is coupled to the ground through the first switch 210, and the second switch 220 is also turned ON by the voltage of the internal node NI, which is equal to twice the supply voltage VS, to discharge the output voltage VO to the discharge node ND.

Therefore, the voltages across the first switch 210 and the second switch 220 are about equal to the supply voltage VS, so that the first switch 210 and the second switch 220 may be implemented by the devices operated with the supply voltage VS.

Figure 3:
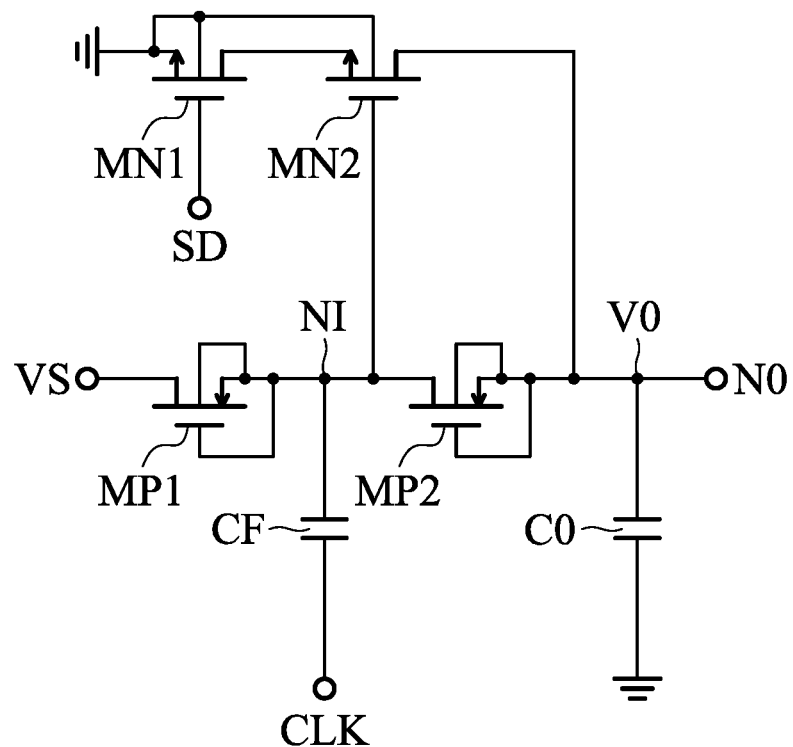
FIG. 3 is a schematic diagram of a charge pump in accordance with another embodiment of the invention.

FIG. 3 is a schematic diagram of a charge pump in accordance with another embodiment of the invention. Comparing the charge pump 300 in FIG. 3 with the charge pump 200 in FIG. 2, the first unidirectional conducting device UC1 and the second unidirectional conducting device UC2 in FIG. 2 are replaced with the first P-type transistor MP1 and the second P-type transistor MP2 in FIG. 3, and the first switch 210 and the second switch 220 in FIG. 2 are replaced with the first N-type transistor MN1 and the second N-type transistor MN2 in FIG. 3.

The first P-type transistor MP1 includes a gate terminal, a source terminal, a drain terminal, and a bulk terminal. The gate terminal of the first P-type transistor MP1 is coupled to the internal mode NI. The source terminal of the first P-type transistor MP1 is coupled to the internal mode NI. The drain terminal of the first P-type transistor MP1 is supplied by the supply voltage VS. The bulk terminal of the first P-type transistor MP1 is coupled to the internal node NI.

The second P-type transistor MP2 includes a gate terminal, a source terminal, a drain terminal, and a bulk terminal. The gate terminal of the second P-type transistor MP2 is coupled to the output node NO. The source terminal of the second P-type transistor MP2 is coupled to the output node NO. The drain terminal of the second P-type transistor MP2 is coupled to the internal node NI. The bulk terminal of the second P-type transistor MP2 is coupled to the output node NO.

According to an embodiment of the invention, a junction breakdown voltage and a gate oxide breakdown voltage of the first P-type transistor MP1 and the second P-type transistor MP2 are less than the output voltage VO. That is, a junction breakdown voltage and a gate oxide breakdown voltage of the first P-type transistor MP1 and the second P-type transistor MP2 are less than twice the supply voltage VS, and the first P-type transistor MP1 and the second P-type transistor MP2 could be implemented by low-voltage process to save chip area.

The first N-type transistor MN1 includes a gate terminal, a source terminal, a drain terminal, and a bulk terminal. The gate terminal of the first N-type transistor MN1 is controlled by the discharge signal SD. The source terminal of the first N-type transistor MN1 is coupled to the ground. The drain terminal of the first N-type transistor MN1 is coupled to the discharge node ND. The bulk terminal of the first N-type transistor MN1 is coupled to the ground.

The second N-type transistor MN2 includes a gate terminal, a source terminal, a drain terminal, and a bulk terminal. The gate terminal of the second N-type transistor MN2 is controlled by the voltage of the internal node NI. The source terminal of the second N-type transistor MN2 is coupled to the discharge node ND. The drain terminal of the second N-type transistor MN2 is coupled to the output node NO. The bulk terminal of the second N-type transistor MN2 is coupled to the ground.

According to an embodiment of the invention, a junction breakdown voltage and a gate oxide breakdown voltage of the first N-type transistor MN1 and the second N-type transistor MN2 are less than the output voltage VO. That is, a junction breakdown voltage and a gate oxide breakdown voltage of the first N-type transistor MN1 and the second N-type transistor MN2 are less than twice the supply voltage VS, and the first N-type transistor MN1 and the second N-type transistor MN2 could be implemented by low-voltage process to save chip area.

Figure 4:
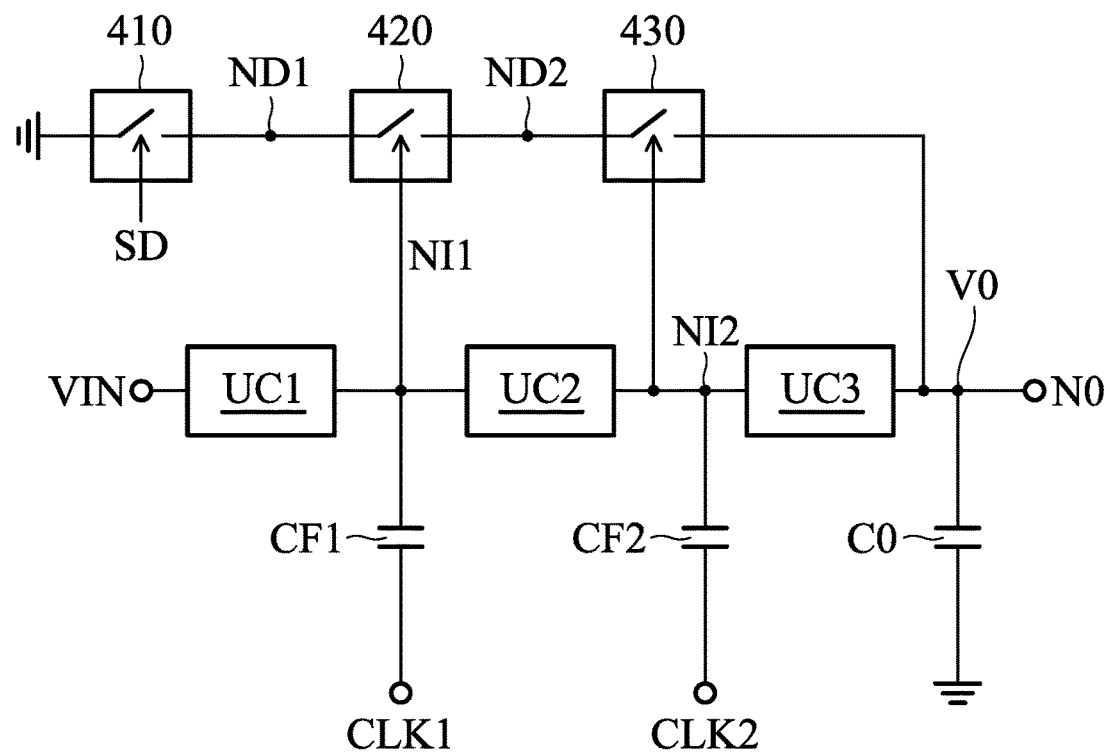
FIG. 4 is a block diagram of a charge pump in accordance with yet another embodiment of the invention.

FIG. 4 is a block diagram of a charge pump in accordance with yet another embodiment of the invention. Comparing the charge pump 400 in FIG. 4 with the charge pump 300 in FIG. 3, the charge pump 400 further includes the third unidirectional conducting device UC3, the third switch 430, the first flying capacitor CF1 and the second flying capacitor CF2, in which the first flying capacitor CF1 is coupled to the first clock signal CLK1 and the second flying capacitor CF2 is coupled to the second clock signal CLK2.

According to other embodiments of the invention, the charge pump 400 may include more unidirectional conducting devices and flying capacitors to boost the output voltage VO to be higher, and the number of switches should be increased accordingly. According to an embodiment of the invention, the first clock signal CLK1 and the second clock signal CLK2 both include a high voltage level equal to the supply voltage VS and a low voltage level equal to the ground.

When the first clock signal CLK1 is at the low voltage level, the supply voltage VS charges the first flying capacitor CF1 through the first unidirectional conducting device UC1. When the first clock signal CLK1 is at the high voltage level and the second clock signal CLK2 is at the low voltage level, the voltage of the first internal node NI1 is boosted to as high as twice the supply voltage VS, which charges the second flying capacitor CF2 through the second unidirectional conducting device UC2. When the second clock signal CLK2 is at the high voltage level, the voltage of the second internal node NI2 is boosted to as high as triple the supply voltage VS and charges the output capacitor CO.

When the discharge signal SD turns ON the first switch 410, the first discharge node ND1 is coupled to the ground. The second switch 420 is turned ON by the voltage of the first internal node NI1 to discharge the voltage of the second discharge node ND2 to the first discharge node ND1. The third switch 430 is turned ON by the voltage of the second internal node NI2 to discharge the output voltage VO.

In other words, the output voltage VO is discharged through the first switch 410, the second switch 420, and the third switch 430 according to the discharge signal SD. The voltages across the first switch 410, the second switch 420, and the third switch 430 are about equal to the supply voltage VS, so that high voltage device is no longer required, unlike the charge pump 100 in FIG. 1. The whole charge pump 400 can be implemented by devices operated with the supply voltage VS to lower the area of chip and the cost of fabrication.

Figure 5:
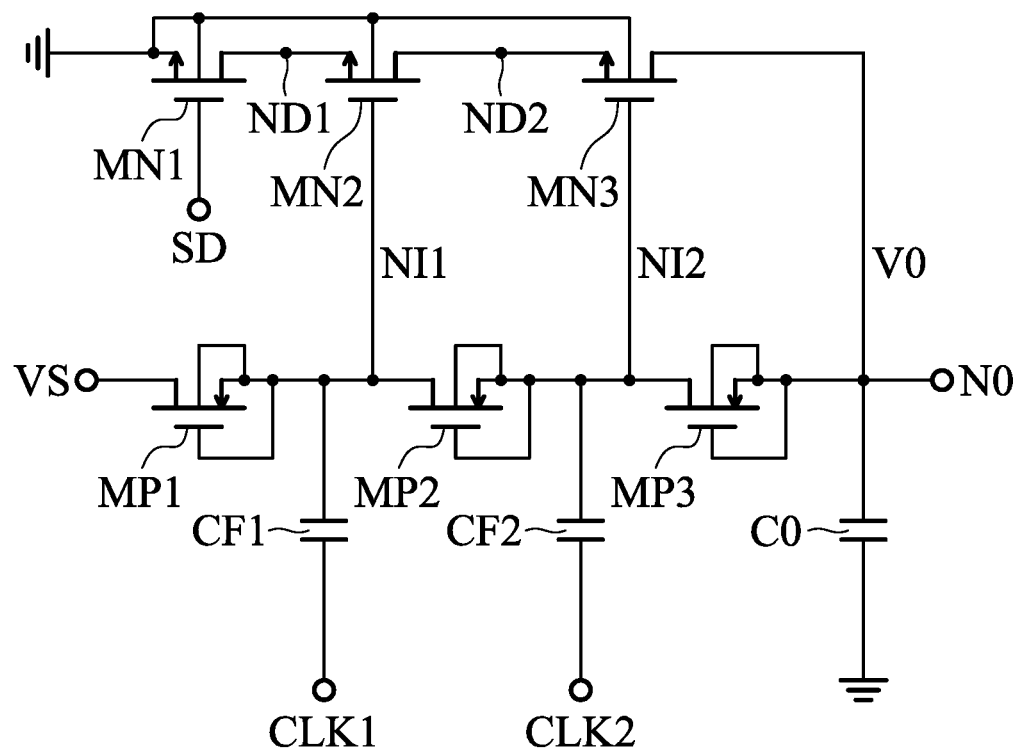
FIG. 5 is a schematic diagram of a charge pump in accordance with yet another embodiment of the invention.

FIG. 5 is a schematic diagram of a charge pump in accordance with yet another embodiment of the invention. Comparing the charge pump 500 in FIG. 5 with the charge pump 400 in FIG. 4, the first unidirectional conducting device UC1, the second unidirectional conducting device UC2, and the third unidirectional conducting device UC3 in FIG. 4 are replaced with the first P-type transistor MP1, the second P-type transistor MP2, and the third P-type transistor MP3 in FIG. 5, and the first switch 410, the second switch 420, and the third switch 430 in FIG. 4 are replaced with the first N-type transistor MN1, the second N-type transistor MN2, and the third N-type transistor in FIG. 5.

The first P-type transistor MP1 includes a gate terminal, a source terminal, a drain terminal, and a bulk terminal. The gate terminal of the first P-type transistor MP1 is coupled to the first internal mode NI1. The source terminal of the first P-type transistor MP1 is coupled to the first internal mode NI1. The drain terminal of the first P-type transistor MP1 is supplied by the supply voltage VS. The bulk terminal of the first P-type transistor MP1 is coupled to the first internal node NI1.

The second P-type transistor MP2 includes a gate terminal, a source terminal, a drain terminal, and a bulk terminal. The gate terminal of the second P-type transistor MP2 is coupled to the second internal node NI2. The source terminal of the second P-type transistor MP2 is coupled to the second internal node NI2. The drain terminal of the second P-type transistor MP2 is coupled to the first internal node NI1. The bulk terminal of the second P-type transistor MP2 is coupled to the second internal node NI2.

The third P-type transistor MP3 includes a gate terminal, a source terminal, a drain terminal, and a bulk terminal. The gate terminal of the third P-type transistor MP3 is coupled to the output node NO. The source terminal of the third P-type transistor MP3 is coupled to the output node NO. The drain terminal of the third P-type transistor MP3 is coupled to the second internal node NI2. The bulk terminal of the second P-type transistor MP2 is coupled to the output node NO.

According to an embodiment of the invention, a junction breakdown voltage and a gate oxide breakdown voltage of the first P-type transistor MP1, the second P-type transistor MP2, and the third P-type transistor MP3 are less than the output voltage VO. More specifically, a junction breakdown voltage and a gate oxide breakdown voltage of the first P-type transistor MP1 and the second P-type transistor MP2 are less than twice the supply voltage VS, and the first P-type transistor MP1 and the second P-type transistor MP2 could be implemented by low-voltage process to save chip area.

The first N-type transistor MN1 includes a gate terminal, a source terminal, a drain terminal, and a bulk terminal. The gate terminal of the first N-type transistor MN1 is controlled by the discharge signal SD. The source terminal of the first N-type transistor MN1 is coupled to the ground. The drain terminal of the first N-type transistor MN1 is coupled to the first discharge node ND1. The bulk terminal of the first N-type transistor MN1 is coupled to the ground.

The second N-type transistor MN2 includes a gate terminal, a source terminal, a drain terminal, and a bulk terminal. The gate terminal of the second N-type transistor MN2 is controlled by the voltage of the first internal node NI1. The source terminal of the second N-type transistor MN2 is coupled to the first discharge node ND1. The drain terminal of the second N-type transistor MN2 is coupled to the second internal node NI2. The bulk terminal of the second N-type transistor MN2 is coupled to the ground.

The third N-type transistor MN3 includes a gate terminal, a source terminal, a drain terminal, and a bulk terminal. The gate terminal of the third N-type transistor MN3 is controlled by the voltage of the second internal node NI2. The source terminal of the third N-type transistor MN3 is coupled to the second discharge node ND2. The drain terminal of the third N-type transistor MN3 is coupled to the output node NO. The bulk terminal of the third N-type transistor MN3 is coupled to the ground.

According to an embodiment of the invention, a junction breakdown voltage and a gate oxide breakdown voltage of the first N-type transistor MN1, the second N-type transistor MN2, and the third N-type transistor MN3 are less than the output voltage VO. More specifically, a junction breakdown voltage and a gate oxide breakdown voltage of the first N-type transistor MN1, the second N-type transistor MN2, and the third N-type transistor MN3 are less than twice the supply voltage VS such that the first N-type transistor MN1, the second N-type transistor MN2, and the third N-type transistor MN3 could be implemented by low-voltage process to save chip area.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:
1. A charge pump, comprising:
   a first unidirectional conducting device, unidirectionally coupling a supply voltage to an internal node;
   a flying capacitor, coupled between the internal node and a clock signal;
   a second unidirectional conducting device, unidirectionally coupling the internal node to an output node;
   an output capacitor, coupled between the output node and a ground;
   a first switch, coupling a discharge node to the ground according to a discharge signal; and
   a second switch, coupling the output node to the discharge node according to a voltage of the internal node.

2. The charge pump of claim 1, wherein the clock signal comprises a high voltage level and a low voltage level, wherein the high voltage level is equal to the supply voltage and the low voltage level is equal to the ground.

3. The charge pump of claim 2, wherein when the clock signal is at the low voltage level, the flying capacitor is charged by the supply voltage through the first unidirectional conducting device, wherein when the clock signal is at the high voltage level, a voltage of the internal node is boosted to twice the supply voltage and charges the output capacitor through the second unidirectional conducting device.

4. The charge pump of claim 3, wherein when the discharge signal is equal to the supply voltage, an output voltage of the output node is discharged to the ground through the first switch and the second switch.

5. The charge pump of claim 4, wherein when the discharge signal is equal to the supply voltage, the first switch is turned ON to discharge the discharge node to the ground, wherein when the voltage of the internal node is boosted to twice the supply voltage, the second switch is turned ON to discharge the output voltage to the discharge node.

6. The charge pump of claim 1, wherein the first switch comprises a first N-type transistor comprising a gate terminal, a source terminal, a drain terminal, and a bulk terminal, wherein the gate terminal is controlled by the discharge signal, the source terminal is coupled to the ground, the drain terminal is coupled to the discharge node, and the bulk terminal is coupled to the ground.

7. The charge pump of claim 6, wherein the second switch comprises a second N-type transistor comprising a gate terminal, a source terminal, a drain terminal, and a bulk terminal, wherein the gate terminal is controlled by a voltage of the internal node, the source terminal is coupled to the discharge node, the drain terminal is coupled to the output node, and the bulk terminal is coupled to the ground.

8. The charge pump of claim 7, wherein a junction breakdown voltage and a gate oxide breakdown voltage of the first N-type transistor and the second N-type transistor are less than an output voltage of the output node.

9. The charge pump of claim 1, wherein the first unidirectional conducting device comprises a first P-type transistor comprising a gate terminal, a source terminal, a drain terminal, and a bulk terminal, wherein the gate terminal is coupled to the internal node, the source terminal is coupled to the internal node, the drain terminal is supplied by the supply voltage, and the bulk terminal is coupled to the internal node.

10. The charge pump of claim 9, wherein the second unidirectional conducting device comprises a second P-type transistor comprising a gate terminal, a source terminal, a drain terminal, and a bulk terminal, wherein the gate terminal is coupled to the output node, the source terminal is coupled to the output node, the drain terminal is coupled to the internal node, and the bulk terminal is coupled to the output node.

11. The charge pump of claim 10, wherein a junction breakdown voltage and a gate oxide breakdown voltage of the first P-type transistor and the second P-type transistor are less than an output voltage of the output node.

12. A charge pump, comprising:
a first unidirectional conducting device, unidirectionally coupling a supply voltage to a first internal node;
a first flying capacitor, coupled between the first internal node and a first clock signal;
a second unidirectional conducting device, unidirectionally coupling the first internal node to a second internal node;
a second flying capacitor, coupled between the second internal node and a second clock signal;
a third unidirectional conducting device, unidirectionally coupling the second internal node to an output node;
an output capacitor, coupled between the output node and a ground;
a first switch, coupling a first discharge node to the ground according to a discharge signal;
a second switch, coupling a second discharge node to the first discharge node according to a voltage of the first internal node; and
a third switch, coupling the output node to the second discharge node according to a voltage of the second internal node.

13. The charge pump of claim 12, wherein the first clock signal and the second clock signal comprise a high voltage level and a low voltage level, wherein the high voltage level is equal to the supply voltage and the low voltage level is equal to the ground.

14. The charge pump of claim 13, wherein when the first clock signal is at the low voltage level, the first flying capacitor is charged by the supply voltage through the first unidirectional conducting device, wherein when the first clock signal is at the high voltage level and the second clock signal is at the low voltage level, a voltage of the first internal node is boosted to twice the supply voltage and charges the second flying capacitor, wherein when the second clock signal is at the high voltage level, a voltage of the second internal node is boosted to triple the supply voltage and charges the output capacitor through the third unidirectional conducting device.

15. The charge pump of claim 14, wherein when the discharge signal is equal to the supply voltage, an output voltage of the output node is discharged to the ground through the first switch, the second switch, and the third switch.

16. The charge pump of claim 15, wherein when the discharge signal is equal to the supply voltage, the first switch is turned ON to discharge the discharge node to the ground, wherein when the voltage of the first internal node is boosted to twice the supply voltage, the second switch is turned ON to discharge the voltage of the second discharge node to the first discharge node, wherein when the voltage of the second internal node is boosted to triple the supply voltage, the third switch is turned ON to discharge the output voltage to the second discharge node.

17. The charge pump of claim 12, wherein the first switch comprises a first N-type transistor comprising a gate terminal, a source terminal, a drain terminal, and a bulk terminal, wherein the gate terminal is controlled by the discharge signal, the source terminal is coupled to the ground, the drain terminal is coupled to the first discharge node, and the bulk terminal is coupled to the ground.

18. The charge pump of claim 17, wherein the second switch comprises a second N-type transistor comprising a gate terminal, a source terminal, a drain terminal, and a bulk terminal, wherein the gate terminal is controlled by a voltage of the first internal node, the source terminal is coupled to the first discharge node, the drain terminal is coupled to the second discharge node, and the bulk terminal is coupled to the ground.

19. The charge pump of claim 18, wherein the third switch comprises a third N-type transistor comprising a gate terminal, a source terminal, a drain terminal, and a bulk terminal, wherein the gate terminal is controlled by a voltage of the second internal node, the source terminal is coupled to the second discharge node, the drain terminal is coupled to the output node, and the bulk terminal is coupled to the ground.

20. The charge pump of claim 19, wherein a junction breakdown voltage and a gate oxide breakdown voltage of the first N-type transistor, the second N-type transistor, and the third N-type transistor are less than twice the supply voltage.

21. The charge pump of claim 12, wherein the first unidirectional conducting device comprises a first P-type transistor comprising a gate terminal, a source terminal, a drain terminal, and a bulk terminal, wherein the gate terminal is coupled to the first internal node, the source terminal is coupled to the first internal node, the drain terminal is supplied by the supply voltage, and the bulk terminal is coupled to the first internal node.

22. The charge pump of claim 21, wherein the second unidirectional conducting device comprises a second P-type transistor comprising a gate terminal, a source terminal, a drain terminal, and a bulk terminal, wherein the gate terminal is coupled to the second internal node, the source terminal is coupled to the second internal node, the drain terminal is coupled to the first internal node, and the bulk terminal is coupled to the second internal node.

23. The charge pump of claim 22, wherein the third unidirectional conducting device comprises a third P-type transistor comprising a gate terminal, a source terminal, a drain terminal, and a bulk terminal, wherein the gate terminal is coupled to the output node, the source terminal is coupled to the output node, the drain terminal is coupled to the second internal node, and the bulk terminal is coupled to the output node.

24. The charge pump of claim 23, wherein a junction breakdown voltage and a gate oxide breakdown voltage of the first P-type transistor, the second P-type transistor, and the third P-type transistor are less than twice the supply voltage.

* * * * *